May 14, 1968   W. MELLOR   3,382,807
POWER TRANSMISSION MECHANISM

Filed July 20, 1966   4 Sheets-Sheet 1

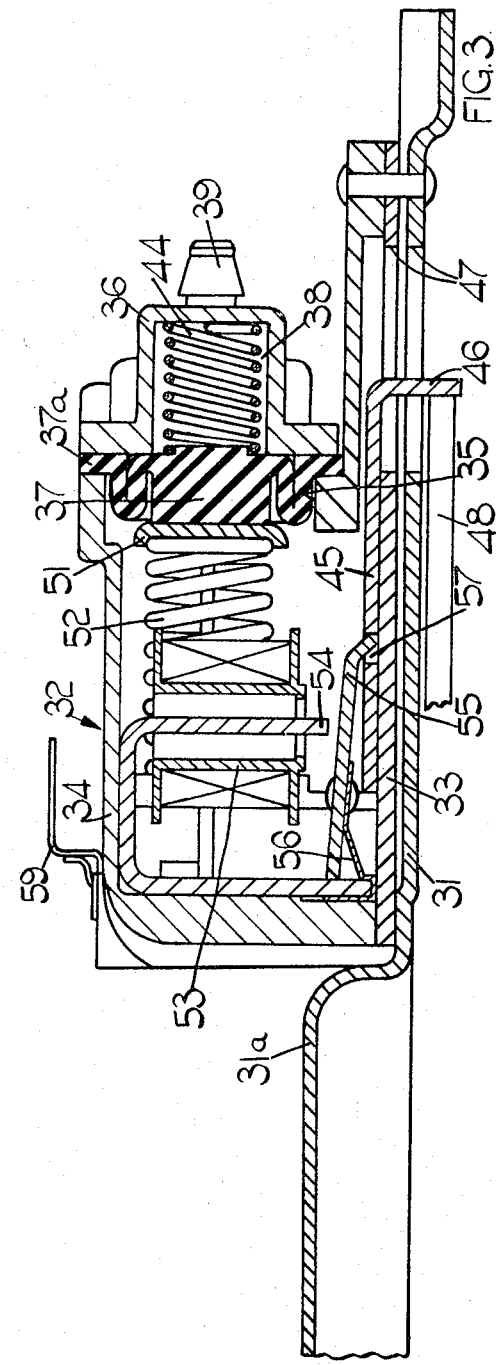

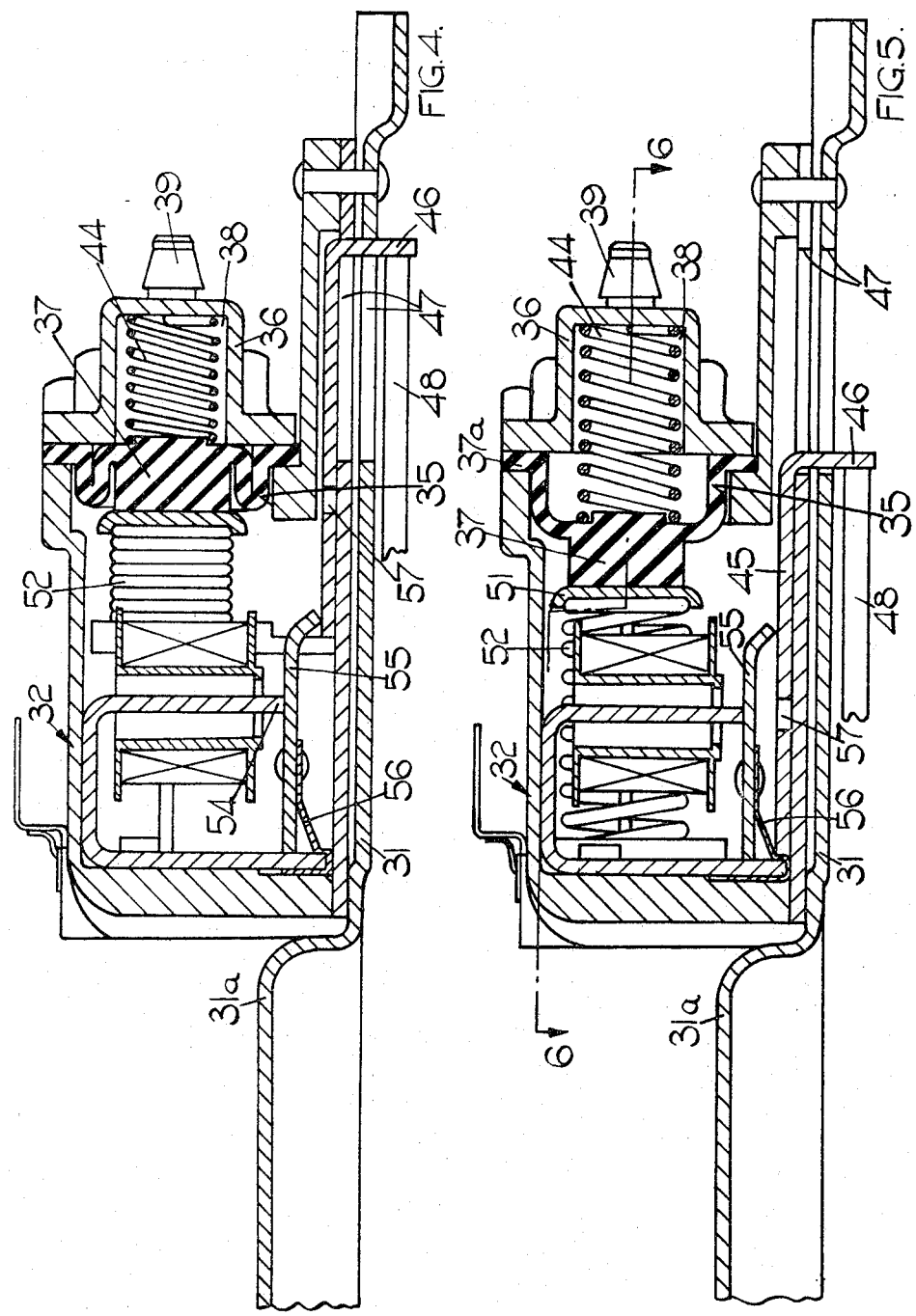

United States Patent Office 3,382,807
Patented May 14, 1968

3,382,807
POWER TRANSMISSION MECHANISM
Walter Mellor, Sutton Coldfield, England, assignor to Joseph Lucas (Industries) Limited, Birmingham, England, a British company
Filed July 20, 1966, Ser. No. 566,539
5 Claims. (Cl. 103—23)

ABSTRACT OF THE DISCLOSURE

A windscreen washer pump for a road vehicle operated by a slide provided that the slide is allowed to move through its full stroke. The slide is operated by the windscreen wiper motor of the vehicle, but normally its reciprocatory movement is limited by a catch, so that the slide does not reciprocate through its full stroke and the windscreen washer pump is not operated. The limited reciprocatory movement permitted by the catch, operates to move the catch to a position adjacent the pole of the solenoid once during each of the limited reciprocations of the slide, and if the solenoid is energised the catch is retained so that the slide operates through its full stroke to operate the pump. Because the catch is moved close to the pole of the solenoid, a smaller solenoid can be used than otherwise.

---

This invention relates particularly to windscreen washers for vehicles, but has more general application to power transmission mechanisms.

The invention in its broadest aspect resides in power transmission mechanism in which a source of power operates in a cycle including a first part during which it can drive a load, and a second part during which it does not drive the load, the mechanism including a solenoid operated catch which prevents the source of power from driving the load except when the solenoid in energised, and means operable during each cycle for moving the catch to a position adjacent the pole of the solenoid.

The invention further resides in a windscreen washer comprising in combination a reciprocable slide adapted to be driven by the windscreen wiper motor of a vehicle when the windscreen wiper motor is operating, a catch resiliently urged to a position in which it engages the slide to limit reciprocation thereof, but when the solenoid is energised, the catch remains disengaged from the slide so that the slide reciprocates through its full stroke, and a windscreen washer pump which is operated to supply cleansing fluid to a windscreen when the slide operates through its full stroke.

It will be appreciated that by virtue of the arrangements specified in the two preceding paragraphs, a smaller solenoid can be used than if the solenoid had to attract the catch from its de-energised position.

Figure 1:
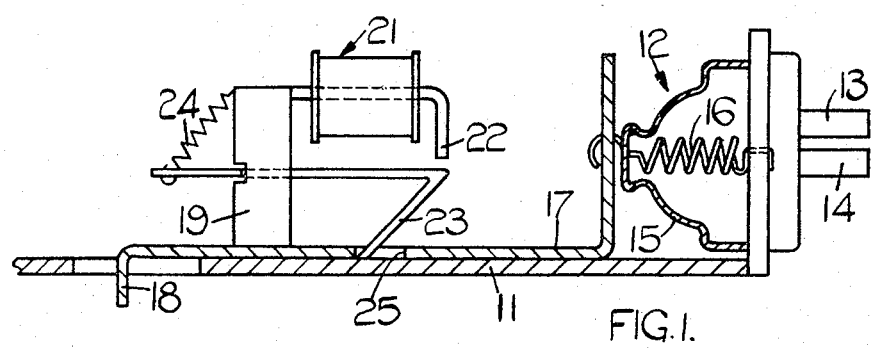

In the accompanying drawings:

FIGURE 1 is a diagrammatic representation of a windscreen washer, constructed in accordance with one example of the invention, in its inoperative position.

Figure 2:
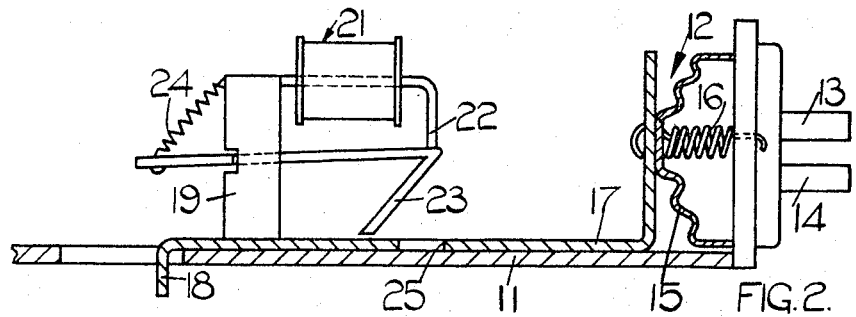
Figure 6:
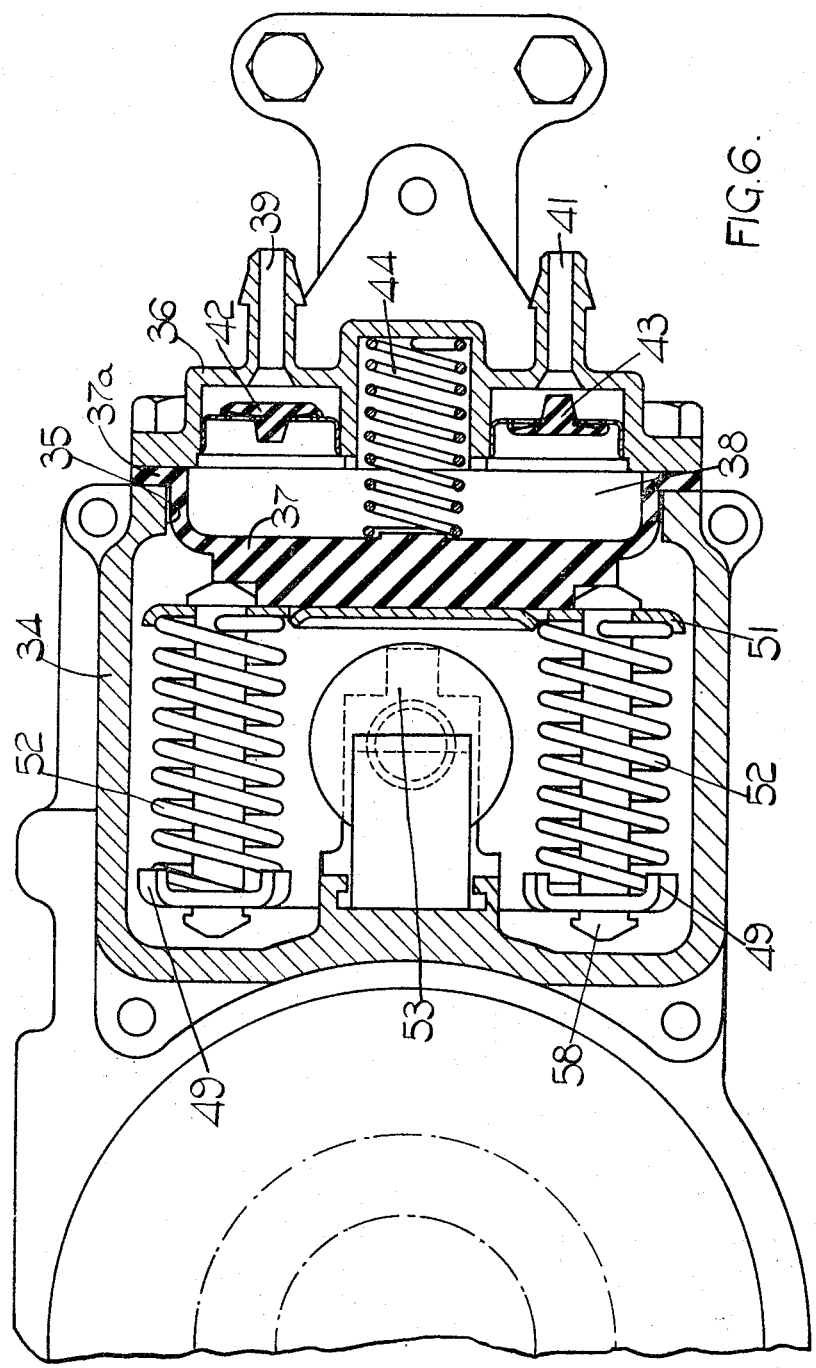

FIGURE 2 is a view similar to FIGURE 1 illustrating the windscreen washer at the termination of a pumping stroke, FIGURE 3 is a sectional view of a practical embodiment of a windscreen washer constructed in accordance with a further example of the invention, the washer being shown in its inoperative position, FIGURES 4 and 5 are views similar to FIGURE 3 showing the washer at the temrination and commencement respectively of a pumping stroke, and FIGURE 6 is a sectional view on the line 6—6 in FIGURE 5.

Referring first to FIGURES 1 and 2, there is provided a fixed plate 11 which supports a known diaphragm type washer pump 12 having an inlet 13 and an outlet 14 provided with suitable valves (not shown). The diaphragm 15 of the pump is urged in its pumping direction by a tension spring 16, and is connected to a slide 17 for moving the diaphragm in the opposite direction. The slide 17 moves on the plate 11, and is formed at one end with a downwardly projecting portion 18 which extends through a hole in the plate 11 for engagement by a cam or connecting rod for moving the slide 17 to the left as shown in the drawings.

Upstanding from the plate 11 is a tower 19 which supports a solenoid having a pole 22. The armature of the solenoid is in the form of a catch 23 pivotally connected to the tower for angular movement in a vertical plane towards and away from the slide 11, the catch 23 being urged by a spring 24 into a slot 25 in the slide 11.

In operation, assuming that the windscreen wiper motor of a vehicle is operating, the motor will move the slide 17 to the left as shown in the drawings, until the rear edge of the slot 25 contacts the catch 23, and moves the catch so that it contacts the pole 22. The solenoid 21 is energised only when it is desired to operate the washer pump, and so assuming that the washers are not operated, the catch 23 will not be held in its upper position by the pole 22. Thus, when the slide moves to the right, as shown in the drawings, under the action of the spring 16, the catch 23 will immediately be returned to the position shown in FIGURE 1 by the spring 24, and so will permit only limited movement of the slide 17 to the right. This movement is insufficient to operate the pump, and if desired a lost motion connection may be introduced between the slide 17 and the diaphragm 15, so that the limited movement permitted under these circumstances does not move the diaphragm 15 at all.

When it is desired to operate the washer pump, the solenoid 21 is energised. The solenoid is not sufficiently powerful to attract the catch 23 from the position shown in FIGURE 1, but when the slide 17 moves the catch 23 into engagement with the pole 22, the catch remains in engagement with the pole 22, so that full movement of the slide 17 to the right under the action of the spring 16 is permitted as shown in FIGURE 2. Thus, the pump is operated in the normal manner, and continues to operate until the solenoid is de-energised.

In place of the tension spring 16, a compression spring can be used positioned between the bellows and a part fixed relative to the plate 11. Moreover, the spring could effect the pumping stroke and the motor the return stroke, the catch being similarly positioned.

Referring now to FIGURES 3 to 6, there is provided a supporting plate 31 adapted at one end 31a to receive a windscreen wiper motor (not shown), the plate 31 being secured in use to the bulkhead of a road vehicle. Secured to the plate 31 is a windscreen washer 32. The windscreen washer 32 comprises a casing 34 secured to a base plate 33, the plate 33 being in turn secured to the plate 31. A vertical face of the casing 34 is formed with a rectangular opening 35 which is closed by a cover 36. A dished rectangular diaphragm 37 having a peripheral outwardly directed flange 37a is disposed within the casing 34 and defines with the cover 36 a chamber 38, the flange 37a being trapped between the periphery of the cover 36 and the edges of the opening 35.

A pair of passages 39, 41 associated with the cover 36 communicate with the chamber 38 through a pair of oppositely oriented non-return valves 42, 43, respectively. The passage 39 serves to connect the chamber 38 with a plurality of outlet jets positioned to supply washing fluid to the vehicle windscreen, while the passage 41 serves to connect the chamber 38 with a washing fluid reservoir. The base of the diaphragm 37 is urged away from the cover 36 by a compression spring 44 housed within the chamber 38.

Slidably supported on the base plate 33 is an actuating slide 45 provided at one end with a portion 46 which extends through a slot 47 in the plates 31 and 33 for engagement by a reciprocating member 48 driven by the wiper motor. At its other end the slide 45 is formed with a pair of channel-shaped portions 49 which extend at right angles to the plate 45. Secured to the base of the diaphragm 37 adjacent the portions 49 is a rigid member 51, a pair of compression springs 52 being arranged in laterally spaced relationship to one another between the portions 49 and the member 51. Extending axially within the springs between the portions 49 and the member 51 is a pair of guide rods 58.

Supported by the casing 34 and occupying the space between the springs 52 is an electromagnet 53 the pole 54 of which extends at right angles to, and is spaced from the slide 45.

A catch 55 is pivoted on the casing for movement between the pole 54 and the slide 45 and is inclined at its free end towards the plate 45, the catch 55 being urged towards the slide 45 by a leaf spring 56. The slide 45 is formed with a hole 57 for receiving the free end of the catch 56.

The casing 34 further supports a pair of terminals (one of which is indicated at 59) through which electrical connections to the electromagnet 53 are made.

It should be noted that the member 48 is not connected to the slide 45. Reciprocation of the member 48 serves to move the slide 45 to the right, as seen in the drawings, return movement of the slide 45 being effected by the combined action of the springs 52 and 44.

In use, when the windscreen washer 32 is inoperative the arrangement of parts is as shown in FIGURE 3.

It will be seen that when the windscreen washer 32 is in this position the diaphragm 37 is deformed, movement of the slide 45 to the left, in the drawing, under the action of the spring 44 to allow the diaphragm to resume its natural shape being prevented by the engagement of the catch 55 in the hole 57 in the slide 45. If the wiper motor is now energized reciprocation of the member 48 will move the slide 45 to the right as seen in the drawings, but since the diaphragm 37 is already deformed no movement of the diaphragm 37 will take place and the movement of the slide 45 will be taken up by compression of the springs 52. The slide 45 is guided during movement relative to the member 51 by the guide rods 58. The springs 52 are strong as compared with the spring 44 and therefore the spring 44 will always be compressed before the springs 52.

During the movement of the slide 45 to the right the catch 55 will contact the edge of the aperture 57 and will be lifted into contact with the pole 54 of the electromagnet 53, the free end of the catch 55 sliding on the slide 45. The position of maximum displacement of the slide 45 to the right is shown in FIGURE 4. When the member 48 reaches the end of its stroke the slide 45 is moved to the left by the springs 52, and the catch 55 under the action of the spring 56 will re-engage with the hole 57 to arrest the slide 45 in the position shown in FIGURE 3. This cycle will repeat while the wiper motor remains energized provided that the electromagnet 53 is de-energised.

In order to pump washing fluid from the reservoir to the outlet jets the electromagnet 53 is energised. The electromagnet 53 is not sufficiently powerful to attract the catch 55 from the position shown in FIGURE 3 but when the slide 45 lifts the catch 55 it remains in contact with the pole 54. In this condition when the slide 45 moves to the left under the action of the springs 52 it is not arrested in the position shown in FIGURE 3 but moves further to the left under the action of the spring 44. Thus the diaphragm resumes its natural shape and in so doing draws fluid from the reservoir, through the valve 43 and into the chamber 38. FIGURE 5 shows the plate 45 in its extreme left position. Subsequent movement of the slide 45 to the right deforms the diaphragm 37 thereby pumping fluid from the chamber 38, through the valve 42 to the outlet jets.

In order to stop the windscreen washer 32 the electromagnet 53 is de-energised so that during subsequent movement of the slide 45 to the left the catch 55 will engage in the hole 57 and thereby arrest the movement of the slide 45 in the position shown in FIGURE 3.

Having thus described my invention what I claim as new and desire to secure by Letters Patent is:

1. A windscreen washer comprising in combination a reciprocable slide adapted to be driven by the windscreen wiper motor of a vehicle when the windscreen wiper motor is operating, a catch resiliently urged to a position in which it engages the slide to limit reciprocatory movement thereof, means operable by said limited reciproposition adjacent the pole of the solenoid during each of catory movement of the slide for moving the catch to a said limited reciprocations of the slide, the arrangement being such that when the solenoid is not energised, the catch returns to its position in which it engages the slide to limit reciprocation thereof, but when the solenoid is energised, the catch remains disengaged from the slide so that the slide reciprocates through its full stroke, and a windscreen washer pump which is operated to supply cleansing fluid to a windscreen when the slide operates through its full stroke.

2. A windscreen washer as claimed in claim 1 wherein the slide is driven by the windscreen wiper motor in a direction to effect the return stroke of the pump, resilient means being incorporated for effecting the pumping stroke of the pump.

3. A windscreen washer as claimed in claim 1 wherein the slide is driven by the windscreen wiper motor in a direction to effect the pumping stroke of the pump, resilient means being incorporated for effecting the return stroke of the pump.

4. A windscreen washer as claimed in claim 1 wherein said permitted reciprocatory movement of the slide is transmitted to the pump but is insufficient to operate the pump to supply cleansing fluid to a windscreen.

5. A windscreen washer as claimed in claim 1 wherein said permitted reciprocatory movement is not transmitted to the pump but is absorbed by a lost motion linkage.

References Cited
UNITED STATES PATENTS

| | | | |
|---|---|---|---|
| 2,389,475 | 11/1945 | Watson | 103—23 X |
| 2,878,505 | 3/1959 | Ziegler | 103—23 X |
| 2,959,803 | 11/1960 | Ziegler | 103—23 X |
| 3,092,029 | 6/1963 | Hamson et al. | 103—23 X |
| 3,115,095 | 12/1963 | Ziegler | 103—23 |
| 3,257,951 | 6/1966 | Espenschied et al. | 103—23 |

FRED C. MATTERN, JR., *Primary Examiner.*

DONLEY J. STOCKING, *Examiner.*

W. J. KRAUSS, *Assistant Examiner.*